(12) United States Patent
Delp

(10) Patent No.: US 9,817,401 B2
(45) Date of Patent: Nov. 14, 2017

(54) OPERATION OF VEHICLE CONTROLS TO EFFECT AUTONOMOUS PASSING, ROAD EXIT AND EXIT SEARCH OPERATIONS

(71) Applicant: Toyota Motor Engineering & Manufacturing North America, Inc., Erlanger, KY (US)

(72) Inventor: Michael J. Delp, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/054,941

(22) Filed: Feb. 26, 2016

(65) Prior Publication Data

US 2017/0248957 A1 Aug. 31, 2017

(51) Int. Cl.
*G05D 1/02* (2006.01)

(52) U.S. Cl.
CPC ......... *G05D 1/0212* (2013.01); *G05D 1/0289* (2013.01)

(58) Field of Classification Search
CPC .... G05D 1/0212; G05D 1/0289; B60W 30/16
USPC .......................................................... 701/23
See application file for complete search history.

(56) References Cited

U.S. PATENT DOCUMENTS

2009/0287367 A1* 11/2009 Salinger ............... G05D 1/0246
701/23
2016/0161267 A1* 6/2016 Harada ................. B60W 30/16
701/25

FOREIGN PATENT DOCUMENTS

DE 4105180 A1 8/1991

\* cited by examiner

*Primary Examiner* — Brian P Sweeney
(74) *Attorney, Agent, or Firm* — Christopher G. Darrow; Darrow Mustafa PC

(57) ABSTRACT

A computing device is configured for communication with at least one autonomously controllable vehicle system or component. The computing device includes one or more processors for controlling operation of the computing device, and a memory for storing data and program instructions usable by the one or more processors. The one or more processors are configured to execute instructions stored in the memory to control the vehicle so as to execute one of an autonomous passing operation, an autonomous road exit operation, and an autonomous exit search operation responsive to manual actuation of an associated control mechanism.

20 Claims, 8 Drawing Sheets

OPERATION OF VEHICLE CONTROLS TO EFFECT AUTONOMOUS PASSING, ROAD EXIT AND EXIT SEARCH OPERATIONS

TECHNICAL FIELD

The present disclosure relates to automated control of vehicles, and, more particularly, to a system and method of executing any of a variety of commands (including autonomous commands and/or strings of commands).

BACKGROUND

Levels of vehicle automation are increasing, through the gradual introduction of autonomous technologies in new vehicles and through retrofits into older vehicles. As the level of vehicle automation increases, the number of operations the vehicle is capable of autonomously executing is increasing. Visual and audio user interfaces may be provided which enable a user to interact with the vehicle control system, to request that the vehicle perform certain operations. However, as the number of possible commends increases, it may be difficult for a user to navigate or operate a user interface so as to execute a desired command in a timely manner.

SUMMARY OF THE INVENTION

In one aspect of the embodiments described herein, a computing device is configured for communication with at least one autonomously controllable vehicle system or component. The computing device includes one or more processors for controlling operation of the computing device, and a memory for storing data and program instructions usable by the one or more processors. The one or more processors are configured to execute instructions stored in the memory to control the vehicle so as to execute one of an autonomous passing operation, an autonomous road exit operation, and an autonomous exit search operation responsive to manual actuation of an associated control mechanism.

In another aspect of the embodiments described herein, a method of controlling an autonomous vehicle is provided. The method includes the step of initiating one of an autonomous passing operation, an autonomous road exit operation, and an autonomous exit search responsive to manual actuation of an associated control mechanism.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

The embodiments described herein relate to a system for initiating execution of a variety of autonomous vehicle operations. Examples of operations which may be performed include an autonomous passing operation, an autonomous road exit operation, and an autonomous exit search operation. In a particular embodiment, a conventional turn signal lever is repurposed to perform the desired operations, as well as performing the functions of a conventional turn signal lever. In other embodiments, any of the desired commands may be initiated by pressing an associated button located on an end of the turn signal lever, or located on the steering wheel adjacent the cruise control command buttons. Where the desired command is initiated by pressing a button, execution of the command may be halted by pressing the button a second time. In this mode, the button acts as a toggle switch, wherein successive operations of the button act to start and then stop execution of the command. In another embodiment, the desired command is initiated by touching an appropriate field on a touch screen. In yet another embodiment, the desired command is initiated by voice command via a suitably configured HMI. Other initiation options may also be implemented.

As will be appreciated by one skilled in the pertinent the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media for executing the functions described herein. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
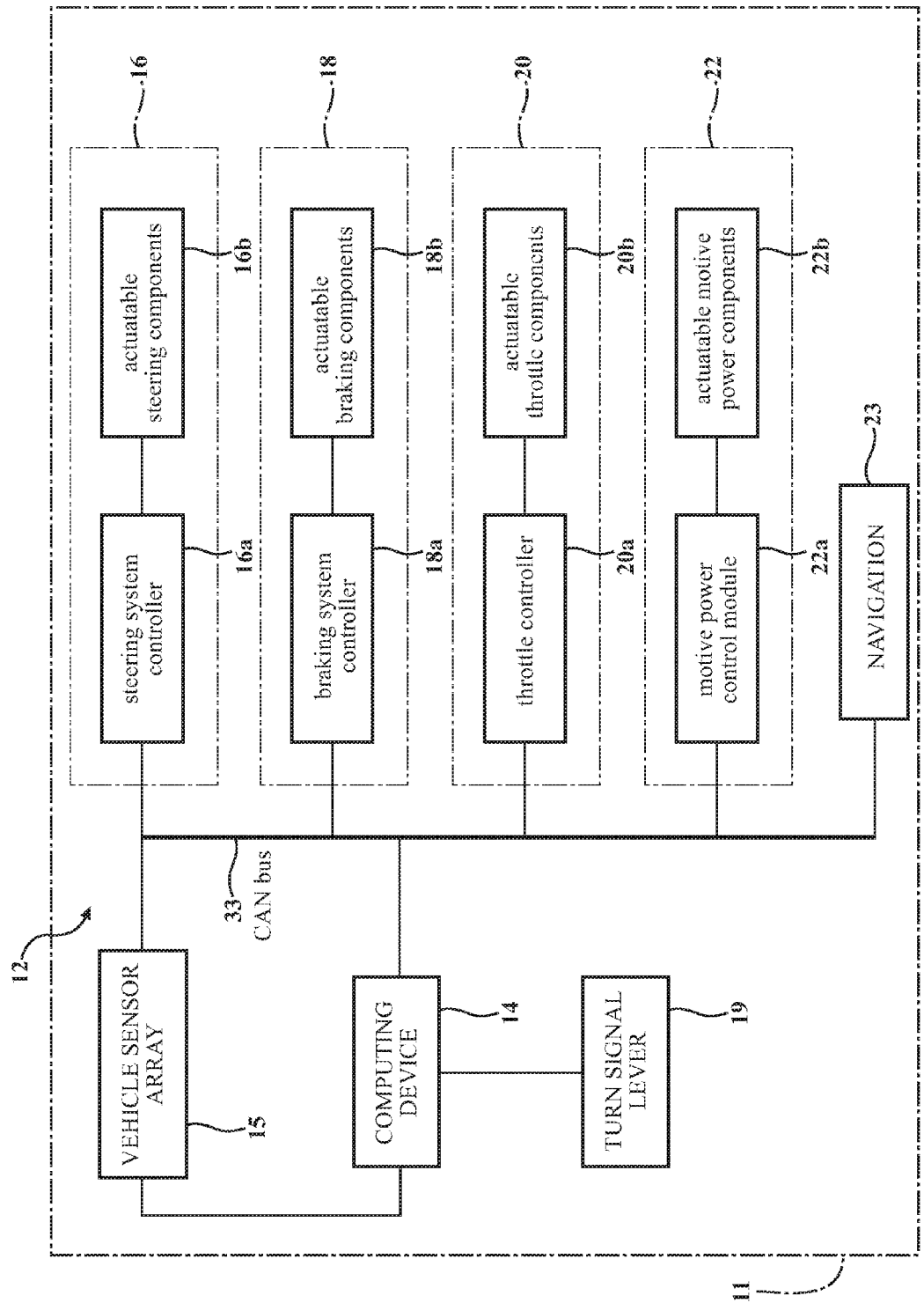
FIG. 1 is shows a schematic arrangement of a portion of a vehicle control system 12 configured for at least partially autonomous control of a vehicle, for the purposes described herein.

FIG. 1 is shows a schematic arrangement of a portion of a vehicle control system 12 configured for at least partially autonomous control of a vehicle 11, for the purposes described herein. The control system 12 includes a computing device 14 and a sensor array 15 in operative communication with the computing device. A plurality of control sub-systems 16, 18, 20, 22, 23 is in operative communication with the sensor array 15 and computing device 14. Each of systems 16, 18, 20, 22, 23 is configured for autonomous operation. For example, the embodiment shown in FIG. 1 includes four primary control systems (an autonomous steering control system 16, an autonomous braking control system 18, an autonomous throttle control system 20, an autonomous motive power control system 22), and a non-primary system (autonomous navigation module 23). A "primary control system" or "primary system" is a system designed to effect control and operation of one of the primary vehicle controls (i.e., brake, steering, throttle, and motive power), as defined above.

Navigation module 23 may be, for example, a known navigation system receiver (for example, a GPS receiver) configured to receive vehicle location information from a navigation system, such as a GPS system. However, navigation module 23 may have any alternative form or configuration suitable for the purposes described herein. Module 23 is also configured to operatively communicate with computing device 14 for providing vehicle navigational information for the purposes described herein. Module 23 may also perform (or assist in performing) any desired route planning for the vehicle, for example, using vehicle occupant destination inputs in a known manner. Computing device may incorporate a suitable navigational interface (not shown in FIG. 2) if needed to facilitate operative communication with navigation module 23.

Each automated sub-system may include an associated specialized controller which is in operative communication with associated actuatable elements operable responsive to control commands received from the controller. For example, braking control system 18 effects automated control of vehicle braking and includes a braking system controller 18a and various actuatable elements (brakes, etc.) 18b necessary for executing braking control commands and configured to be operable responsive to control commands received from the braking controller. Steering system 16 includes a steering system controller 16a in operative communication with associated actuatable steering components 16b necessary for executing steering control commands. Throttle system 20 includes a throttle controller 20a in operative communication with associated actuatable throttle components 20b necessary for executing throttle control commands. Motive power system 22 includes a motive power system controller 22a in operative communication with associated actuatable motive power components 22b necessary for executing motive power control commands.

Examples of specific systems and/or capabilities which may be incorporated into the vehicle control system include adaptive cruise control, electronic stability control, automated lane centering, forward collision warning, lane departure warning, and blind spot monitoring. Additional controls, systems and/or capabilities may be provided if needed to perform the functions described herein, depending on the design of a particular vehicle. The vehicle embodiments described herein are assumed to have sufficient autonomous systems and/or capabilities to execute one or more of the passing, road exit, exit search and other operations described herein, and to provide the user notifications and control transfers (from manual to autonomous operation, and vice versa) described herein.

The control system 12 may be configured so that the various controllers, sensors and other elements of the system can communicate with each other using a controller area network (CAN) bus 33 (FIG. 1) or the like. Via the CAN bus and/or other wired or wireless mechanisms, the computing device 14 may transmit messages to various devices in the vehicle and/or receive messages from the various devices, e.g., controllers, actuators, sensors, etc.

Figure 2:
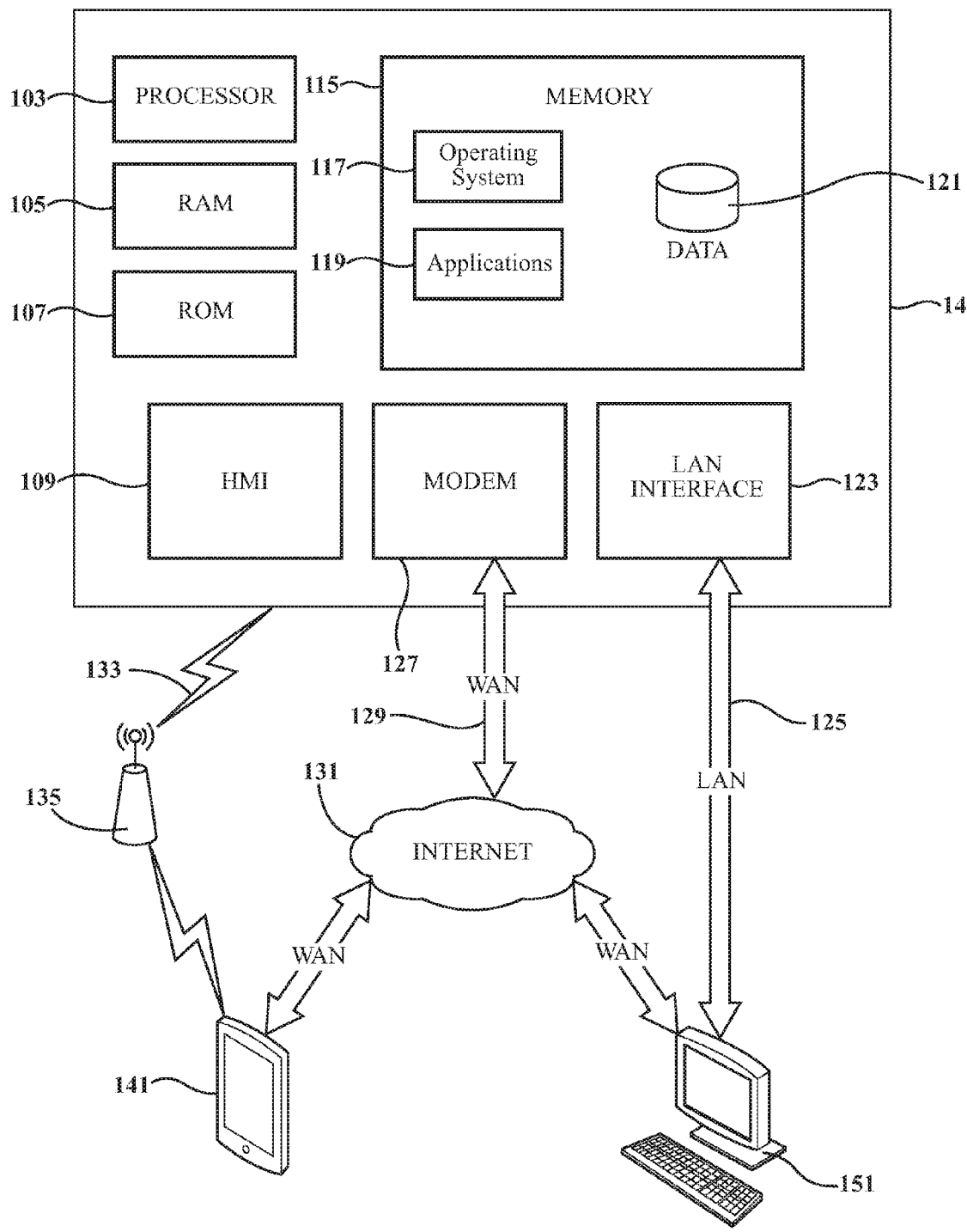
FIG. 2 is a block diagram of a computing device in the vehicle control system of FIG. 1.

FIG. 2 illustrates a block diagram of a computing device 14 in the vehicle control system 12 that may be used according to one or more illustrative embodiments of the disclosure. The computing device 14 may have a processor 103 for controlling overall operation of the device 14 and its associated components, including RAM 105, ROM 107, an input/output module or human-machine interface (HMI) 109, and computer-readable storage or memory 115. The computing device 14, along with one or more additional computing devices (e.g., specialized controllers 16a, 18a, 20a, 22a, 23, terminals 141, 151) and other devices may correspond to any of multiple systems or devices configured as described herein for functions such as autonomously (i.e., without vehicle operator or occupant input) operating the entire vehicle or specific portions of the vehicle. Computing device 14 may be embodied in a vehicle controller, for example.

Computing device 14 may be configured to serve as an autonomous driving module, coordinating operations of the specialized controllers 16a, 18a, 20a, 22a, 23 and controlling (or assisting in coordinated control of) all autonomous driving operations, including steering, braking, etc. Computing device 14 may also be configured to operate the various vehicle systems and components so as to execute various autonomous commands or maneuvers (for example, passing other vehicles driving in the same lane as the ego-vehicle, exiting a road along which the ego-vehicle is currently driving, and searching for an exit nearest to the vehicle), responsive to manual operation of a turn signal lever 19 by a user as described herein. Computing device 14 may also be configured to enable a user to select a desired mode of operation of the turn signal lever, as described in greater detail below. Computing device 14 may also be configured to operatively communicate with navigation module 23 as previously described.

Computing device 14 may also be configured to receive and store information from the sensor array 15, from any of specialized control modules 16a, 18a, 20a, 22a, 23 and from any other vehicle components pertaining to operation of the automated vehicle control systems. The computing device 14 may also be configured to receive and store the information so that all of the information is time-correlated and may be processed for diagnostic purposes.

A computer-readable storage or memory 115 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Input/Output (I/O) module or HMI 109 may include a microphone, keypad, touch screen, and/or stylus through which a user of the computing device 14 may provide input, and may also include one or more of a speaker for providing audio output and a video display device for providing textual, audiovisual and/or graphical output. Software may be stored within memory 115 and/or storage to provide instructions to processor 103 for enabling device 14 to perform various functions. For example, memory 115 may store software used by the device 14, such as an operating system 117, application programs 119, and an associated internal database 121. Processor 103 and its associated components may allow the computing device 14 to execute a series of computer-readable instructions to receive occupant feedback and to perform other interface-related functions as described herein. The interface 109 may incorporate and implement a voice recognition routine, allowing the control system to present information and selection options through a speaker, and to receive driver input through a microphone.

The visual and voice interfaces described herein may be embodied in any one of a variety of computing devices including a processor and a memory, as well as communication capabilities. For example, the interfaces may operate on a portable computer, tablet computer, a smart phone, etc. that includes capabilities for wireless communications using IEEE 802.11, Bluetooth, and/or cellular communications protocols. Further, the device implementing the interface may use such communication capabilities to communicate with a vehicle computing device 14. A device could communicate with a vehicle computer 14 via other mechanisms such as a network in the vehicle, a known protocol such as Bluetooth, etc. Accordingly, the user device may be used to carry out certain operations herein ascribed to a data collector 110, e.g., voice recognition functions, cameras, global positioning system (GPS) functions, etc., and the user device could be used to provide data to the computing device 14, and may be used to provide a human machine interface (HMI) to the computing device 14. Thus, the visual and voice interfaces described herein may be embodied in one or more application programs in a cellular phone, PDA, or other wireless device, for example. These embodiments of the interfaces may enable communication with the vehicle control system without the need installation of a touch screen or audio equipment in the vehicle interior. In another embodiment, the wireless device may communicate with the vehicle control system via a suitable docking station or port residing in the vehicle interior.

The various computing devices may operate in a networked environment supporting connections to one or more remote computers, such as terminals/devices 141 and 151. Computing device 14 and any other computing devices and related terminals/devices 141 and 151, may include devices installed in vehicles, mobile devices that may travel within vehicles, or devices outside of vehicles that are configured to receive and process vehicle and driving data. Thus, the computing device 14 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, suitably-configured wearable devices (such as a watchband) and the like)(not shown), and may include some or all of the elements described above with respect to the computing device 14. In addition, any of these computing device embodiments may include a haptic interface or may be configured to provide haptic feedback to a vehicle occupant to inform the occupant of a change in automation status, an active or pending alert, or any other automation status or condition which should be communicated to the occupant. The network connections depicted in FIG. 2 include a local area network (LAN) 125 and a wide area network (WAN) 129, and a wireless telecommunications network 133, but may also include other networks. When used in a LAN networking environment, the driving analysis computing device 14 may be connected to the LAN 125 through a network interface or adapter 123. When used in a WAN networking environment, the device 14 may include a modem 127 or other means for establishing communications over the WAN 129, such as network 131 (e.g., the Internet). When used in a wireless telecommunications network 133, the device 14 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133. These configurations provide various ways of enabling data, occupant ride quality feedback, and other information to be elicited, received, processed, and displayed exterior of the vehicle.

It will be appreciated that the network connections shown are illustrative and other means of establishing a communications link between the various computing devices may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Control system 12 includes an array 15 of vehicle sensors designed to monitor various vehicle operational parameters and environmental conditions external to the vehicle. In a known manner, the vehicle sensors provide data used by the various controllers in formulating and executing suitable control commands in the autonomous vehicle systems 16, 18, 20, 22, 23. For example, data from inertial sensors, wheel speed sensors, road condition sensors, and steering angle sensors may be processed in formulating and executing a command in steering system 16 to turn the vehicle. Examples (not shown) of sensors that may be incorporated into a semi-autonomous or fully autonomous vehicle sensor array include radar and lidar systems, laser scanners, vision/camera systems, GPS systems, various inertial sensors such as gyroscopes and accelerometers, vehicle wheel speed sensors, road condition sensors, suspension height sensors, steering angle sensors, steering torque sensors, brake pressure sensors, accelerator or pedal position sensor, and tire pressure sensors.

For example, the sensor array 15 may include various types of sensors in communication with other control system components, for providing feedback on operations of the vehicle. For example, sensors 15 may detect and store data corresponding to the vehicle's location (e.g., GPS coordinates), speed and direction, rates of acceleration or braking, and specific instances of sudden acceleration, braking, and swerving. Sensors 15 also may detect and store data received from the vehicle's internal systems, relating to such factors as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's various computing devices.

Additional ones of sensors 15 may detect and store information relating to external driving conditions, for example, external temperature, rain, snow, light levels, and sun position for driver visibility. For example, external cameras and proximity sensors, radar, lidar and other types of sensors may detect other nearby vehicles, traffic levels, road conditions, traffic obstructions, animals, cyclists, pedestrians, and other conditions that may factor into a driving event data analysis. Sensors 15 also may detect and store data relating to moving violations and the observance of traffic signals and signs by the vehicle. Additional ones of sensors 15 may detect and store data relating to the maintenance of the vehicle, such as the engine status, oil level, engine coolant temperature, odometer reading, the level of fuel in the fuel tank, engine revolutions per minute (RPMs), and/or tire pressure.

Vehicle sensors 15 also may include cameras and/or proximity sensors capable of recording additional conditions inside or outside of the vehicle. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, unsecured objects in the vehicle). Sensors 15 also may be configured to collect data a driver's movements or the condition of a driver. For example, vehicle may include sensors that monitor a driver's movements, such as the driver's eye position and/or head position, etc. Additional ones of sensors 15 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer.

Certain of vehicle sensors 15 also may collect information regarding the driver's route choice, whether the driver follows a given route, and to classify the type of trip (e.g. commute, errand, new route, etc.). In certain embodiments, sensors and/or cameras may determine when and how often the vehicle stays in a single lane or stray into other lanes. A Global Positioning System (GPS), locational sensors positioned inside the vehicle, and/or locational sensors or devices external to the vehicle may be used determine the route, lane position, and other vehicle position/location data.

The data collected by vehicle sensors 15 may be stored and/or analyzed within the vehicle and/or may be transmitted to one or more external devices. For example, the sensor data may be transmitted via telematics devices to one or more remote computing devices, such as a mobile device or laptop computer. Any data collected by vehicle sensors 15 may also be transmitted to any vehicle system or component requiring or utilizing the data for the purposes described herein. For example, the data collected by vehicle sensors 15 may be transmitted to vehicle controller 14, to one or more specialized component controllers, or to the HMI 109.

Particular vehicle sensors may be incorporated into one of the specialized vehicle controllers 16*a*, 18*a*, 20*a*, 22*a*. Particular vehicle sensors may also configured to provide inputs to more than one vehicle control system. For example, in a vehicle incorporating both automated steering and braking control, various road condition sensors may provide data to both the steering system controller and the braking controller to enable these controllers to process the road condition information in accordance with stored processor-executable instructions, and to formulate appropriate control commands to the steering system and braking system. In addition, the various specialized controllers 16*a*, 18*a*, 20*a*, 22*a* in the vehicle may operate effectively as sensors or as data collectors to provide data or inputs via the CAN bus 33 enabling communication between the elements of the control system.

FIG. 1 shows just a few examples of automated vehicle sub-systems 16, 18, 20, 22, 23 which may be incorporated into a vehicle. A particular vehicle may incorporate one or more of these systems or other systems (not shown) in addition to one or more of the systems shown.

If a controller requires an integrated or composite signal formed from outputs of multiple individual sensors, a known sensor fusion means (incorporating, for example, a suitable Kalman filter) may be introduced between the sensor array (or the pertinent sensor(s)) and the pertinent controller or incorporated into the controller. Also, if a sensor output signal requires pre-processing prior to use by a controller, a known pre-processing means (for example, an A/D converter) may be introduced between the sensor array (or the pertinent sensor(s)) and the pertinent controller or incorporated into the controller. Similarly, if operation of any actuatable sub-system components will require processing of a control signal received from a controller, a known processing means (for example, an A/D converter) may be introduced between the controller and the actuatable components or incorporated into the controller.

Referring again to FIG.1, in embodiments described herein, the vehicle 11 also incorporates a turn signal lever 19 extending from the steering column as known in the art, for conventional operation of the vehicle turn signals and (optionally) headlights during manual operation of the vehicle. Turn signal lever 19 is also configured (or configurable) to initiate execution of a predetermined autonomous command or series of commands during autonomous operation of the vehicle, upon manual actuation of the lever in a manner as described herein. Operating the turn signal lever (for example, by single-clicking, double-clicking or triple-clicking the lever) as described herein may initiate commands which override any normal autonomous ego-vehicle guidance in progress, to the degree necessary to execute the commands. However, manual control of the ego-vehicle may always be reasserted by the vehicle operator in a conventional manner (for example, by turning the steering wheel, operating the accelerator pedal or brakes, single-clicking the turn signal lever to signal a turn or lane change, etc.).

Any of the autonomous operations or commands described herein may be initiated by actuation of an associated control mechanism. For example, referring to FIG. 8, the desired operation may be initiated by pressing a dedicated button 811 located on an end of the turn signal lever 812, or an associated button (one of buttons 817*a*, 817*b*, 817*c*) located on the steering wheel 813, for example, adjacent the cruise control command buttons 815. Where the desired command is initiated by pressing a button, execution of the command may be halted by pressing the button a second time. In this mode, the button acts as a toggle switch, wherein successive operations of the button act to start and then stop execution of the command. Alternatively, the command may be initiated by operation of a conventional turn signal lever as described in greater detail below. In another embodiment, the command is initiated by touching an appropriate field (for example, one of fields 820*a*, 820*b*, 820*c*) on a suitably configured touch screen 822 of an interface 109 operatively coupled to the remainder of the vehicle control system 12. In yet another embodiment, the passing command is initiated by voice command via interface 109. Other initiation options may also be implemented.

In a first operational mode, an autonomous passing operation is initiated by actuation of the control mechanism. In the following particular embodiment, the passing operation will be described as initiated by actuation of a vehicle turn signal lever which is operable to initiate the passing command. However, it will be understood that the vehicle (including control system 12) may be configured to initiate the passing command using any of the other control mechanisms mentioned above, and that the steps performed during actual execution of the command will be the same, no matter how the command is initiated.

Figure 3:
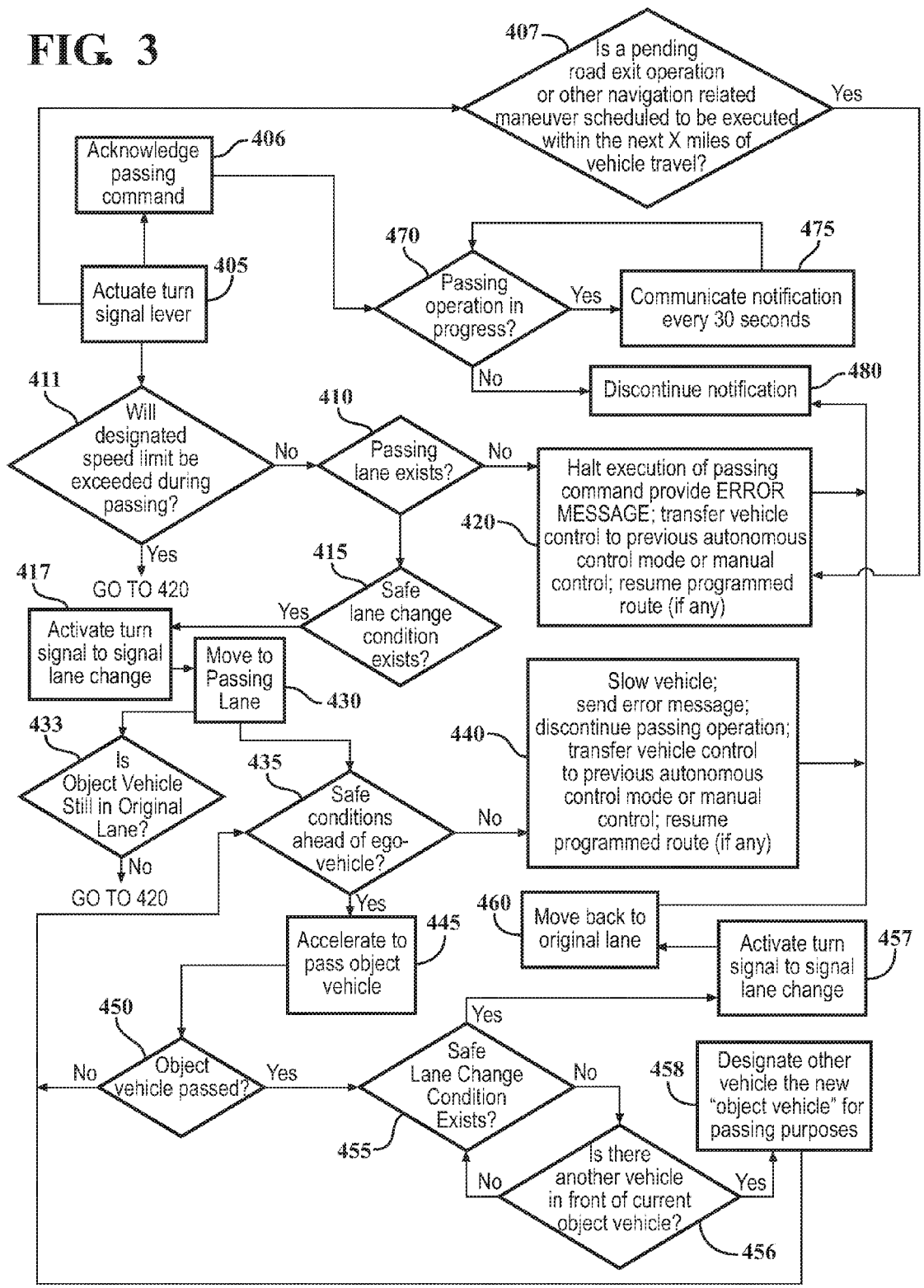
FIG. 3 shows a flow diagram of one embodiment of an autonomous passing operation performed by the vehicle upon actuation of a turn signal lever.

In one embodiment, actuation of the turn signal lever in a predetermined manner initiates execution of the autonomous passing operation. By this actuation, the user notifies the control system that a passing operation is desired. FIG. 3 shows a flow diagram of one embodiment of an autonomous passing operation performed by the vehicle upon actuation of the turn signal lever in the manner prescribed. In a conventional passing operation, and in a particular embodiment described herein, the passing direction will be on the driver's left side of the vehicle. Although a conventional passing operation may be executed on the driver's left side of the ego-vehicle, the passing operation may alternatively be executed on the right side of the ego-vehicle if conditions permit.

Figure 8:
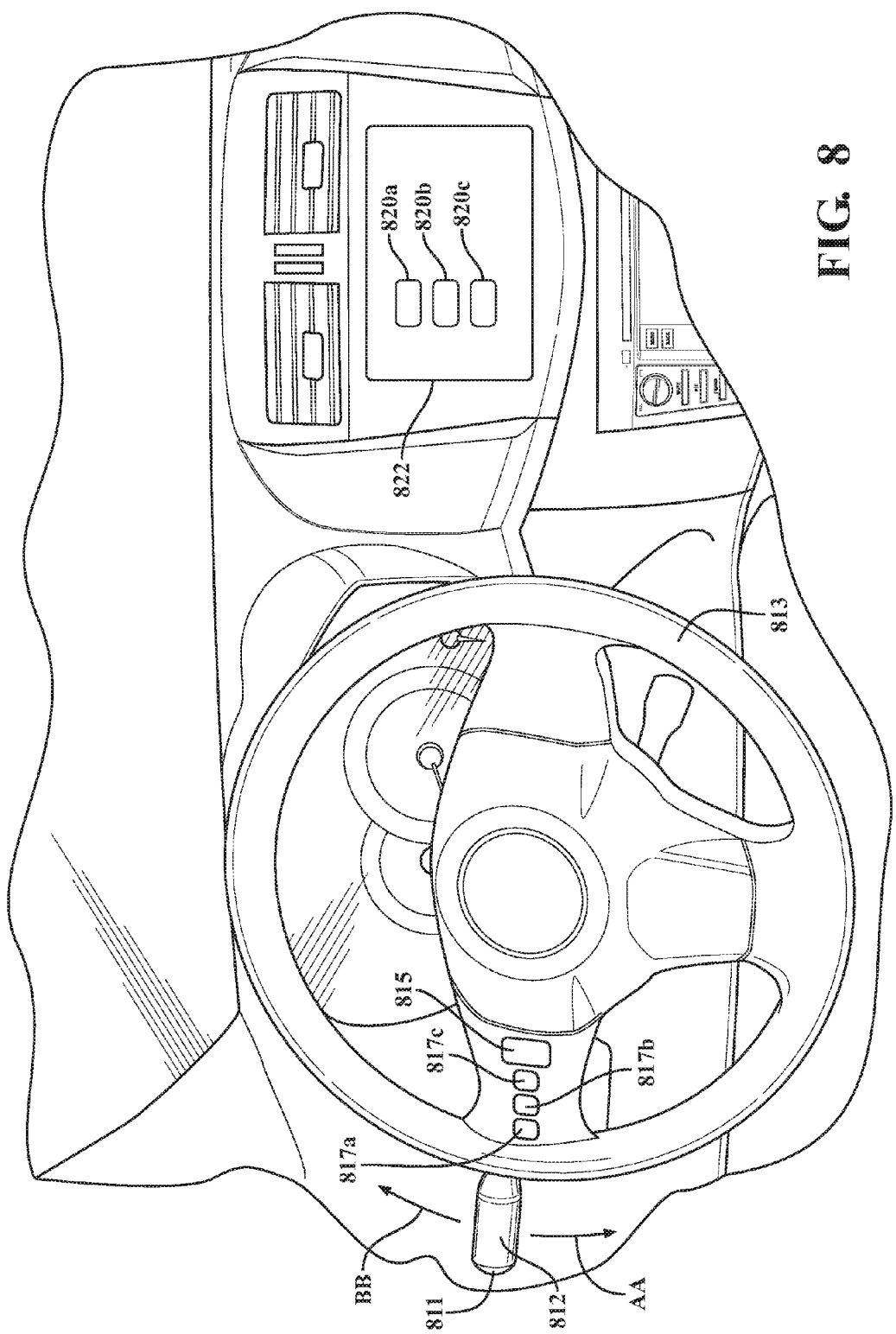
FIG. 8 is a schematic view illustrating the locations and actuation modes of various possible autonomous command initiation mechanisms as described herein.

In block 405, the turn signal lever 19 is actuated to initiate execution of the passing maneuver. In a particular embodiment, a passing maneuver to the left is initiated by "double-clicking" the turn signal lever downwardly (in direction "AA" or counterclockwise as shown in FIG. 8). As is known in the art, "clicking" a turn signal lever involves rotating the lever downwardly or upwardly until a "click" is heard or felt, as would be done to activate the turn signal in a conventional manner, and then quickly returning the lever to its unactuated position. "Double-clicking" the lever involves performing this "click" operation twice in quick succession. The system may also be configured to initiate a passing maneuver to the right by "double-clicking" the turn signal lever upwardly (or clockwise, in this embodiment). At the end of the second movement of the lever from the neutral or unactuated position, the lever is left in the actuated position. For example, for a left lane passing operation initiated by double-clicking, at the end of the second downward movement of the lever from the neutral or unactuated position to an actuated position, the lever is left in the downward actuated position. In this embodiment, the passing command may then be halted by movement of the lever upwardly (in direction "BB" or clockwise as shown in FIG. 8), back to the neutral position.

The exit operation and passing directions and the directions in which the turn signal lever is actuated to initiate the various commands as described herein are for countries such as the United States, where vehicles are driven in the right lane(s) of a highway. However, it is understood that the exit operation and passing directions and the directions in which the turn signal lever is actuated to initiate the various commands may be reversed as needed for countries where vehicles are driven on the opposite or left side of the road. For example, in the United Kingdom, the turn signal lever may be configured to actuate in the counterclockwise direction to initiate a road exit operation along a left side of the road.

In block 410, the control system 12 checks to determine if there is a suitable passing lane adjacent the ego-vehicle in the passing direction (i.e., in the direction in which the vehicle will change lanes when leaving the current lane). For this purpose, the control system may use sensor data and vehicle systems (for example, lane marker detection), reference to GPS maps of the road, or any other suitable method. If it is determined that, for example, a solid line exists along the passing side of the current lane or if the GPS map or a lane-keeping system indicates the presence of a road shoulder adjacent the current lane, the ego-vehicle may already be in a left-most or right-most lane. In this embodiment, the control system 12 may be configured to not autonomously execute a passing operation along a road shoulder. Alternatively, detection of a double-solid line may indicate a lane containing oncoming traffic in the desired passing direction. Thus, in either of these cases, control may transfer to block 420, in which the computing device 14 may halt the passing operation and communicate an error message to the user indicating that the requested passing operation cannot be executed. The vehicle may also return to whichever control mode (autonomous or manual) it was in prior to actuation of the turn signal lever. Alternatively, the vehicle may automatically be returned to manual control after alerting the driver to the need for manual control. If the vehicle was following a route programmed by the navigation system, the vehicle may return to or resume the programmed route.

Simultaneously with the operation of determining whether a suitable passing lane exists, the control system may provide an acknowledgement (via audio, visual display, or both) (block 406) that the passing command has been received and is in progress.

Simultaneously with acknowledgement of receipt of the passing command, in block 407 the computing device also begins to constantly continuously determine if there is a pending road exit operation (as described herein) or other route-related maneuver (for example, a maneuver dictated by adherence to a planned route determined by the navigation system) scheduled to be executed within the next X miles of vehicle travel. A condition may arise where the planned route includes taking a road exit or following of a path dictated by a road fork, for example. If, at any time during the passing maneuver, it is determined that there is a pending road exit operation or other route-related maneuver scheduled to be executed less than a predetermined distance X from the current position of the vehicle, the route-related maneuver may be given precedence and control may be transferred to block 420, thereby halting the requested passing operation.

In the embodiments described with regard to FIG. 3, the halting of the passing operation under any of the conditions described herein will take priority over any other, simultaneously occurring operations. The predetermined distance X may be determined dynamically by the computing device 14 based on such factors as the speed of the ego and surrounding vehicles, the lane the ego-vehicle is driving in in relation to the side of the road where a designated exit is located, and other pertinent factors. In a particular embodiment, the distance X is set to a default value of 2 miles. The distance X is designed to allow the vehicle sufficient time to get in position to execute any subsequent maneuver(s) dictated by the planned navigation route (if any), in most or all cases.

In block 407, simultaneously with acknowledgement of receipt of the passing command, the computing device 14 continuously determines if there is a pending road exit operation (as described herein) or other navigation-related maneuver (for example, a maneuver dictated by adherence to a planned route determined by the navigation system) scheduled to be executed within the next X miles of vehicle travel. This is designed to allow a safe distance for the passing command to be executed. If, at any time during the passing maneuver, it is determined that there is a pending road exit operation or other route-related maneuver scheduled to be executed within the next X miles of vehicle travel, the route-related maneuver may be given precedence and control may be transferred to block 420, thereby halting the requested passing operation. The parameter X may be dynamically adjusted according to factors such as the speed of the ego-vehicle, the estimated distance of the ego-vehicle to the next exit or navigation-related maneuver, and other pertinent factors.

Figure 7:
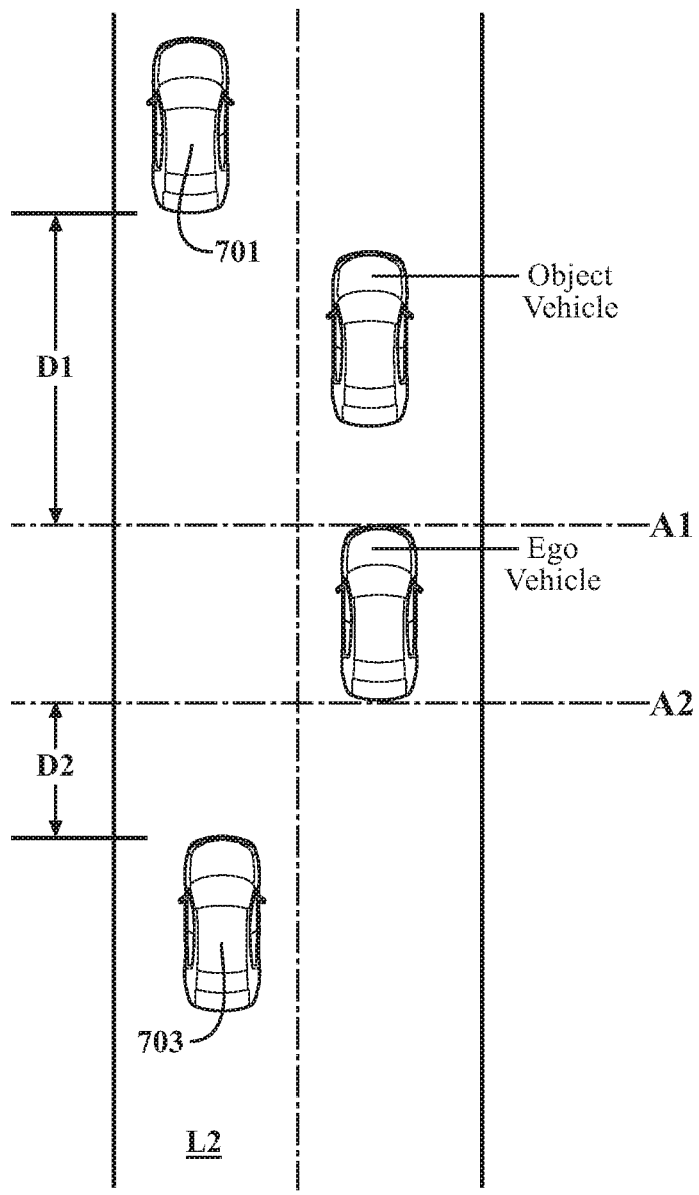
FIG. 7 is a schematic view illustrating criteria for a safe lane change condition, in accordance with an embodiment described herein.

In block 415, if a suitable passing lane exists next to the ego-vehicle in the passing direction, the control system then uses sensors 15 to continuously monitor and evaluate the ego-vehicle surroundings for conditions facilitating a safe lane change into the passing lane. Referring to FIG. 7, criteria for a safe lane change condition may include, for example, the presence of at least a minimum predetermined gap or empty space D1 between a vertical plane A1 extending along a forward-most portion of the ego-vehicle and extending orthogonally with respect to the driving direction of the ego-vehicle, and the closest vehicle 701 (if any vehicle is within sensor range) driving in a passing lane L2 and ahead of the ego-vehicle. Criteria for a safe lane change condition may also include, for example, the presence of at least a minimum predetermined gap or empty space D2 between a vertical plane A2 extending along a forward-most portion of the ego-vehicle and extending orthogonally with respect to the driving direction of the ego-vehicle, and the closest vehicle 703 (if any vehicle is within sensor range) driving in the passing lane L2 and behind the ego-vehicle. The computing device 14 may determine the lengths of the required gaps based on the speeds at which the ego and other vehicles are traveling and any other pertinent factors. Alternative criteria may also be used. Monitoring for the safe lane-change conditions continues until these conditions are found or until the lane-change operation is discontinued.

Also, simultaneously with acknowledgement of receipt of the passing command in block 406, in block 411 the computing device also starts to continuously estimate the speed required to pass the object vehicle and estimates whether a predetermined ego-vehicle speed limit will be exceeded during the passing operation. To facilitate the passing operation, the computing device may be configured to automatically accelerate the ego-vehicle to a passing speed that is a predetermined level (for example, 10 mph) above the detected current speed of the object vehicle. However, this passing speed may exceed either a speed limit on the road or a maximum speed which the vehicle occupants feel comfortable with. The computing device 14 is configured to estimate the passing speed and to compare this speed with the speed limit on the road and/or a maximum speed which the vehicle occupants feel comfortable with. The maximum occupant "comfort speed" may be set by the occupant using a touch screen or by voice command, using HMI 109.

The road speed limit may be determined using any suitable means. For example, the speed limit on the traveled section of road may be available to the computing device through the navigation system. Alternatively, the ego-vehicle may be equipped with a vision system and character-recognition capability configured for reading road signs and extracting the applicable speed limits therefrom. If at any time during the passing operation the computing device 14 estimates that either the maximum occupant "comfort speed" and/or the road speed limit will be exceeded during the passing operation, control may pass to block 420, where the passing operation may be halted.

Referring back to block 415, if a safe lane change condition is detected, the computing device 14 (in block 417) operates the vehicle turn signal to signal a pending lane change. Then, in block 430, the control system operates the ego-vehicle to move it from the current lane into the passing lane, which then becomes the new current lane. During the lane change, the system also constantly monitors the vehicle surroundings (including both the original lane and the new current lane) for dangerous conditions. In the embodiments described herein, the vehicle control system 12 is configured to assume that, upon activation of the passing command, an object vehicle immediately in front of or leading the ego-vehicle is the vehicle to be passed. Thus, as part of monitoring the ego-vehicle surroundings during the passing operation, the control system constantly monitors the speed and position of the vehicle to be passed.

In block 435, after changing lanes, the control system continuously monitors the current lane ahead of the ego-vehicle for additional vehicles and/or dangerous conditions. Also, after block 430, the control system also (in block 433) continuously monitors the object vehicle to verify that this vehicle is still driving in the original lane. If, during the passing maneuver, the object vehicle leaves the original lane, control may pass to block 420 where the passing operation is halted and other commands are executed as previously described.

In block 440, if adjustment of the ego-vehicle speed during passing brings the ego-vehicle too close to another vehicle ahead in the current lane or otherwise unsafe conditions are detected ahead of the ego-vehicle, the ego-vehicle is automatically slowed. The control system may then communicate a message to the user that the passing operation has been discontinued and discontinue the reminder notification. The vehicle may then return to whichever control mode (autonomous or manual) it was in prior to actuation of the turn signal lever. Alternatively, the vehicle may automatically be returned to manual control after alerting the driver to the need for manual control.

In block 445, if safe conditions are detected ahead of the ego-vehicle, the ego-vehicle speed is constantly adjusted so as to pass the object vehicle. This speed adjustment continues until the vehicle in the ego vehicle's previous lane (the "object vehicle") is passed or until the passing command is halted. As long as conditions ahead of the ego-vehicle are deemed to be safe, in a loop formed by blocks 435/445/450, the control system 12 operates the vehicle so as to pass the object vehicle. Blocks 435, 445, and 450 are continuously executed until the ego-vehicle has passed the object vehicle.

In block 455, after the ego-vehicle has passed the object vehicle, the control system again continuously monitors road and traffic conditions for a safe lane change condition in the original lane from which the ego-vehicle initiated the passing operation. Monitoring for the safe lane-change conditions continues until these conditions are found or until the lane-change operation is discontinued.

In block 456, if a safe lane change condition is not detected, the system determines if another vehicle is driving in front of the object vehicle and close enough to the object vehicle so that there is insufficient space for the ego-vehicle to re-enter the original traffic lane. If there is no additional vehicle that meets these conditions, control may transfer back to block 455, where the control system continues to monitor for safe lane change conditions as previously described. However, if there is an additional vehicle driving that meets these conditions, the computing device may designate this additional vehicle as the new "object vehicle" for purposes of executing the passing command. Control may then be transferred back to block 435, from which passing of the newly designated object vehicle is executed as previously described.

In block 460, when a safe lane change condition is detected, the computing device 14 (in block 457) operates the vehicle turn signal to signal a pending lane change. Then, the vehicle is operated so as to change lanes from the passing lane back to the original lane, while also monitoring for unsafe conditions. The control system may be configured to, after the vehicle re-enters the original lane, set the vehicle cruise control settings to the same settings (if any) that were implemented prior to initiation of the passing operation.

During execution of the passing procedure, the control system also monitors GPS maps and ego-vehicle surroundings to help ensure that the vehicle is staying on its pre-planned overall route (if any).

Referring to blocks 470 and 475, after acknowledgement of the passing command in block 406, the computing device 14 is configured to continuously monitor whether the passing operation is still in progress. While the passing operation is in progress, the computing device 14 may also communicate (via audio, visual display, or both) a notification to a user indicating that the operation is still in progress. This notification may be repeated (for example, every 30 seconds) (block 475) to remind the user that a passing operation is in progress. This is especially useful if any portion of the autonomous passing operation is delayed (for example, by traffic or road conditions). In addition, the control system may communicate to the user (via audio, visual display, or both) the reasons why the operation has been delayed. The user may also be notified when the passing operation resumes. In block 480, when the passing operation is complete or discontinued, the notification is also discontinued.

To cancel the passing operation while the operation is still in progress, the user/driver may move the turn signal lever back to its "neutral" or unactuated position. For example, when the lever resides in a downward position after actuating a passing operation via a left lane, clicking the lever upwardly back into its neutral position may be used to discontinue the passing operation. The control system may then provide an acknowledgement (via audio, visual display, or both) of the "stop" command and an indication that the passing operation has been halted and discontinue any reminder notifications. The vehicle may then return to whichever control mode (autonomous or manual) it was in prior to actuation of the turn signal lever. Alternatively, the vehicle may automatically be returned to manual control after the driver has been alerted to the need for manual control, or the control system may implement an alternative, pre-programmed default operation.

The various operations shown in FIG. 3 and FIG. 7 will automatically continue until the road-exit operation is executed (i.e., the vehicle exits the road) or until discontinued by the user. If any autonomous passing or road exit command is terminated by a user, the vehicle may return to whichever control mode (autonomous or manual) it was in prior to actuation of the turn signal lever. Alternatively, the vehicle may automatically be returned to manual control after the driver has been alerted to the need for manual control. If the vehicle was following a route programmed by the navigation system, the vehicle may return to or resume the programmed route. The control system 12 may be configured so that a termination command by the user will immediately override and discontinue (within the limits of safety) the road exit operation shown in FIG. 4.

Figure 4:
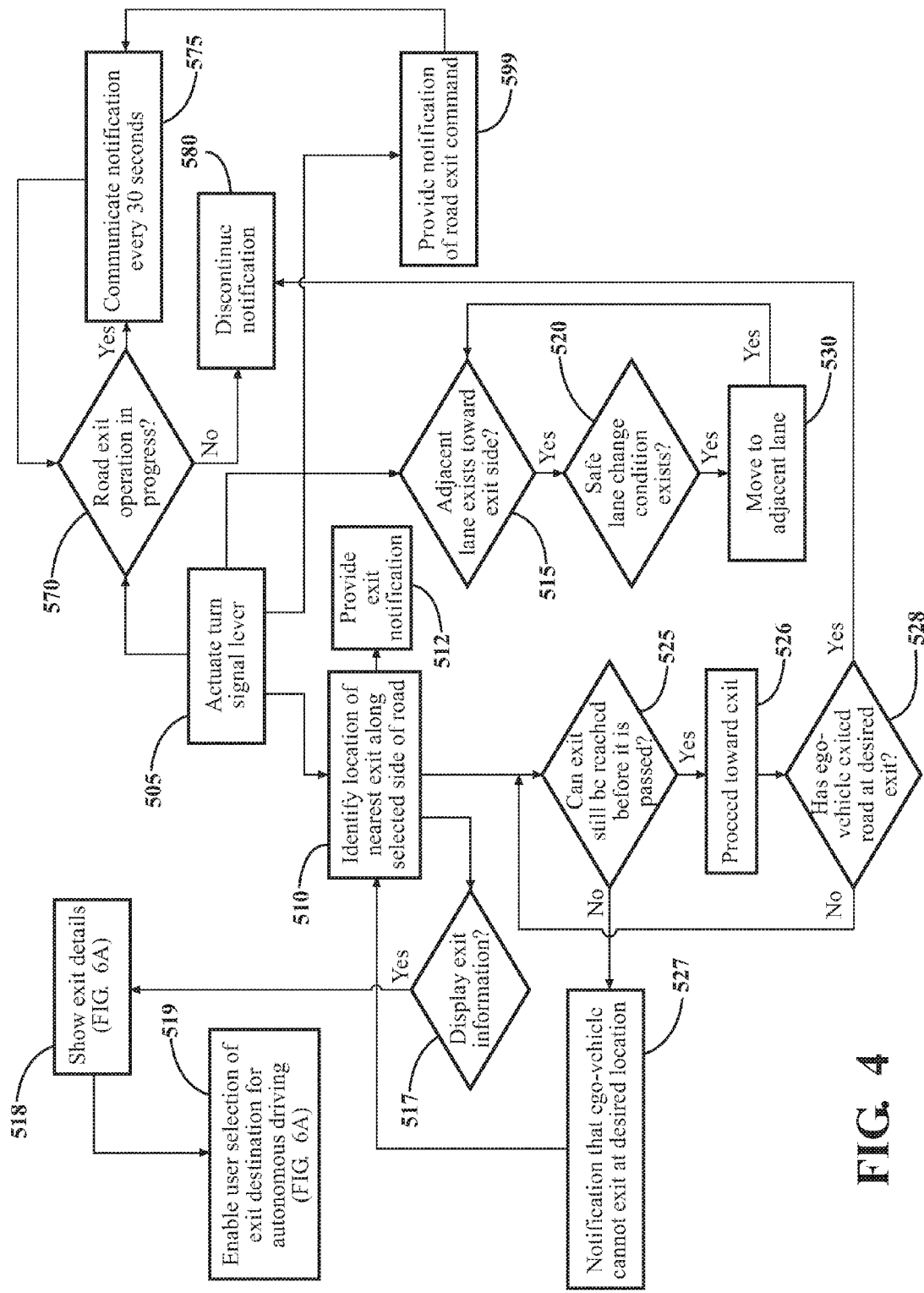
FIG. 4 shows a flow diagram of one embodiment of an autonomous road exiting operation performed by a vehicle upon actuation of a turn signal lever.

In a second operational mode, actuation of the turn signal lever in a predetermined manner initiates execution of a road exiting operation. By this actuation, the user notifies the control system that a road exiting operation is desired. FIG. 4 shows a flow diagram of one embodiment of an autonomous road exiting operation performed by the vehicle upon actuation of the turn signal lever in the manner prescribed. The control system may be configured to direct the vehicle to exit the road along either the left side or the right side of the road.

In block 505, the turn signal lever is actuated to initiate execution of the road exiting maneuver. In a particular embodiment, a road exiting maneuver to the left is initiated by "triple-clicking" the turn signal lever downwardly. The system may be configured to initiate a road exiting maneuver to the right by "triple-clicking" the turn signal lever upwardly. "Triple-clicking" the lever involves performing the "click" operation three times in quick succession. At the end of the third movement of the lever from the neutral or unactuated position to an actuated position, the lever is left in the actuated condition. For example, for a right side road exit maneuver initiated by triple-clicking, at the end of the third upward movement of the lever from the neutral or unactuated position to the actuated position, the lever is left in the upward actuated position. In this embodiment, the road exit command may then be halted by movement of the lever downwardly, back to the neutral position.

In block 510, the control system 12 determines the location of the nearest exit along the side of the road on which the autonomous road exit operation is to occur. This may be done with reference to navigation system maps. Alternatively, the vehicle may incorporate a camera/vision system an optical recognition system (not shown) configured for reading and interpreting traffic and road signs. Such a system may be configured to detect and interpret, for example, overhead road direction and exit signs and to use this information in determining the distance to an exit and the side of the road on which the exit resides.

The control system 12 may be configured to (in block 512) provide an exit notification to the driver alerting the driver that an exit has been located, provide the distance to the exit, and confirm the side of the road on which the vehicle will exit. For example, a notification (via audio, visual display, or both) may be provided stating that "We will exit at Exit 123 on the right side of the road in 4 miles. This is in 5 minutes at the current speed". This notification may be updated and repeated, for example, every 30 seconds until the vehicle exits the road.

Figure 6A:
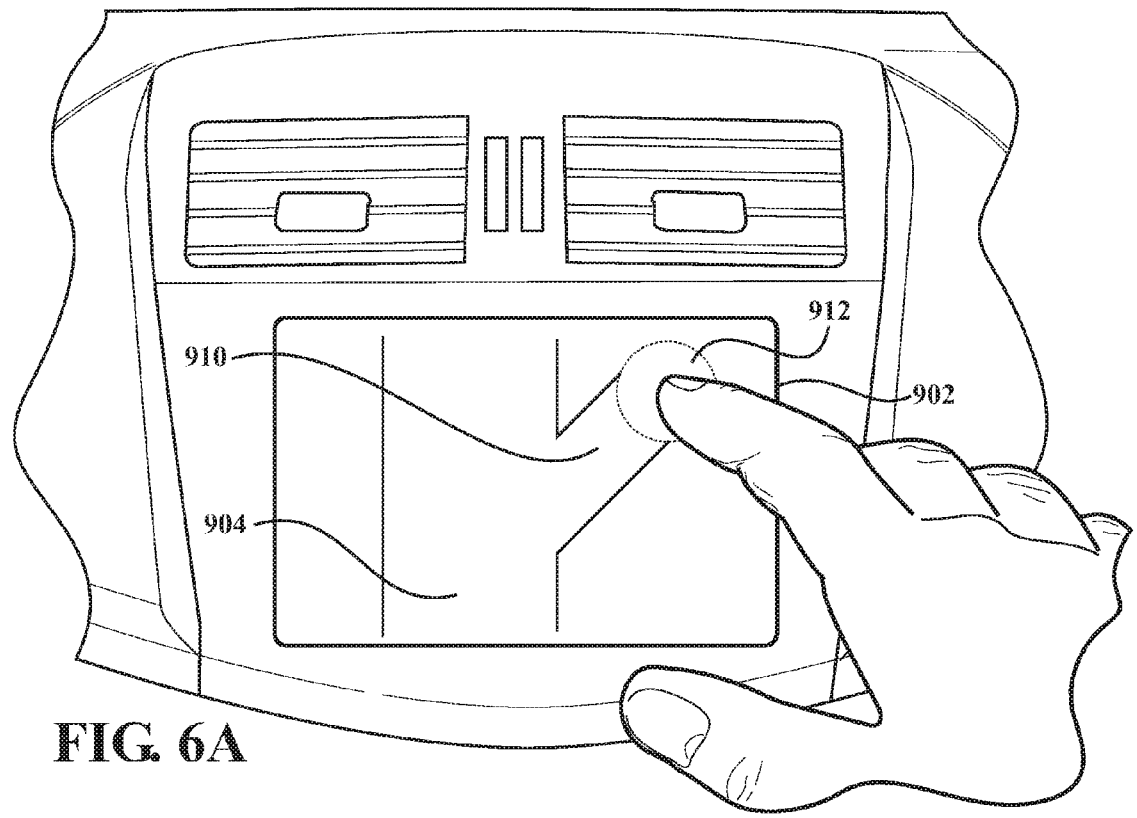
FIG. 6A is a schematic view of a touch screen displaying an exemplary layout of a portion of a road including an exit from the road.

In a particular embodiment, the control system 12 is configured to offer via HMI 109 an option (in block 517) to the user to display information relating to the nearest exit after the location of the nearest exit has been determined. In one example (shown in FIG. 6A), if the user elects this option, HMI 109 includes a touch screen 902 which displays a schematic view of the road 904 leading up to and including the exit 910. The display 902 may also enable touch activation of an end portion 912 of the exit road. This touch activation may lead to the view 916 shown in FIG. 6B, which contains information including a schematic representation of the details of the exit 910, including the road layout and the relative positions and positions of various structures and/or facilities 920, 922, 924 (for example, gas stations, food stores, parks, etc.) located at and/or within a predetermined distance from the exit road end 912. The display may also include any other information which is available, such as the actual name of a fast-food chain or gas station chain, for example. The display may also show the distance from the end 912 of the exit road to each facility. Information relating to the various facilities 920, 922, 924 may be obtained from GPS or other navigation system map information or any other suitable source.

Figure 6B:
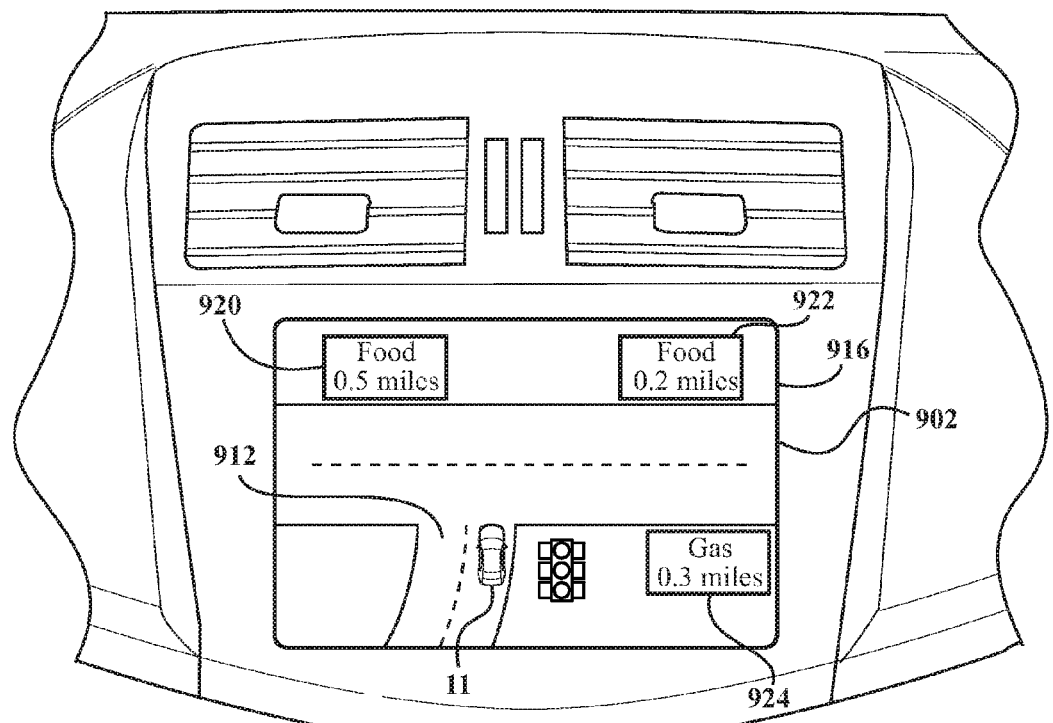
FIG. 6B is a schematic view of a touch screen displaying the exit of FIG. 6A and an area surrounding the end of the road exit.

In block 519, in a particular embodiment, the control system is configured to enable selection of one of the facilities 920, 922, 924 shown in FIG. 6B by touching the screen icon or representation of the facility. The control system is configured to, after the ego-vehicle reaches the end of the exit road, autonomously drive the vehicle to the selected facility. If a selection is not made by the user, the vehicle will revert to guidance along a pre-planned route (if any) or will revert to manual control as previously described.

Referring to block 515 of FIG. 4, simultaneously with determining the closest exit in block 510, the control system 10 may check to determine if a traffic lane exists adjacent the ego-vehicle's current lane, on the side of the road along which the vehicle is to exit. For this purpose, the control system may use sensor data and vehicle systems (for example, lane marker detection), reference to GPS maps of the road, or any other suitable method. If it is determined in block 515 that a solid line exists along the passing side of the current lane or if the GPS map may indicates the presence of a road shoulder adjacent the current lane, the ego-vehicle may already be in a left-most (or right-most) lane. In this case, the vehicle may not need to change lanes to reach the exit lane.

If another open traffic lane exists toward the exit side of the road, the ego-vehicle may need to change lanes to that side prior to exiting. Then, in block 520, the control system 12 uses sensors 15 to continuously monitor the ego-vehicle surroundings for conditions facilitating a safe lane change into the adjacent lane. The control system may use the same safe lane change criteria and procedure used for the passing operation, as previously described. Monitoring for the safe lane-change conditions continues until these conditions are found or until the lane-change operation is discontinued.

In block 530, if a safe lane change condition is detected, the control system operates the ego-vehicle to move it from the current lane into the adjacent lane, which then becomes the new current lane. The procedures in blocks 515, 520, 530 are then repeated to determine if another lane change toward the exit side of the road is needed. If no further lane changes are needed, the vehicle continues in the current lane until the exit is reached. The steps 515, 520, 530 are repeated as often as necessary to position the vehicle in the lane required for exiting along the desired side of the road. The effect of the procedures in blocks 515, 520, 530 will be to bias the vehicle as far as possible toward the side of the road along which the desired exit resides. Thus, for a right side road exit, the procedure just described will continue until the vehicle is in the right-most lane.

After the turn signal lever has been actuated in block 505, and simultaneously with the operations in blocks 510 and 515, the control system may provide (in block 599) an acknowledgement (via audio, visual display, or both) that the road exit command has been received and is in progress. A notification that the road exit operation is in progress may be repeated regularly (for example, every 30 seconds) (block 575) until the exit operation is complete or discontinued.

After identifying (in block 510) the location of the nearest exit along the selected side of the road, the control system 12 may continuously calculate (in block 525) an estimate as to whether the ego-vehicle can still exit the road at the desired location. Factors affecting this estimation include the speed of the ego-vehicle, the distance along the road from the ego-vehicle's current position to the exit, the location of the ego-vehicle's current lane with respect to the exit lane (which may be estimated from information obtained during execution of block 515), and traffic flow and density in any lanes between the current lane and the exit lane.

If, in block 525, the computing device 14 determines that the ego-vehicle can still exit the road at the desired location, control transfers to block 526 whereby the vehicle is autonomously directed toward the designated exit. In block 528, the computing device 14 determines if the vehicle has exited the road yet at the desired exit. If the vehicle has not yet exited the road, control returns to block 525, and the loop 525/526/528 is executed until the vehicle exits the road.

If it is determined in block 525 that the ego-vehicle cannot exit the road at the desired location (for example, if the ego-vehicle is not in the lane required for exiting the road by the time the ego-vehicle has reached a predetermined distance from the exit), It is assumed that the vehicle will not be able to make the necessary lane change(s) in time to exit the road at the desired exit. The computing device is configured to then (in block 527) provide an error message or notification designed to convey to the user that the ego-vehicle will not be able to exit the road at the desired location. In this case, control will pass to block 510, where the system will seek to determine the location of the next available exit on the desired side of the road. In the manner just described, the system will continue to attempt to reach the nearest exit on the selected side of the road until the autonomous road exit operation is halted by the user or by another error condition.

Referring to blocks 570 and 575, while the autonomous road exit operation is in progress, the control system may also communicate (via audio, visual display, or both) a notification to a user indicating that the operation is still in progress. This notification may be repeated (for example, every 30 seconds) to remind the user that a road exit operation is in progress. This is especially useful if any portion of the autonomous passing operation is delayed (for example, by traffic or road conditions). In addition, the control system may communicate to the user (via audio, visual display, or both) the reasons why the operation has been delayed. The user may also be notified when the road exit operation resumes.

In block 580, when the road exit operation is complete or discontinued, the notification is also discontinued.

The various operations shown in FIG. 4 will automatically continue until the road-exit operation is executed (i.e., the vehicle exits the road) or until discontinued by the user. If any autonomous passing or road exit command is terminated by a user (for example, by double-clicking the lever in the same direction used to initiate the road exit command), the vehicle may return to whichever control mode (autonomous or manual) it was in prior to actuation of the turn signal lever. Alternatively, the vehicle may automatically be returned to manual control after the driver has been alerted to the need for manual control. If the vehicle was following a route programmed by the navigation system, the vehicle may return to or resume the programmed route. The control system 12 may be configured so that a termination command by the user will immediately override and discontinue (within the limits of safety) the road exit operation shown in FIG. 4.

In a particular embodiment, notification that a passing or road exit operation is being executed may be in the form of a repeating "chirping" sound. A grouping of a distinctive number of "chirps" may be provided for each type of operation. A user may be trained or familiarized as to the meaning of each grouping by providing a visual and/or audio description of the operation in conjunction with an associated number of chirps whenever the operation is executed, for the first thousand miles of vehicle use. After the first thousand miles, the notification of the operation via visual and/or audio description may (at the option of the user) either be discontinued or continued.

Figure 5:
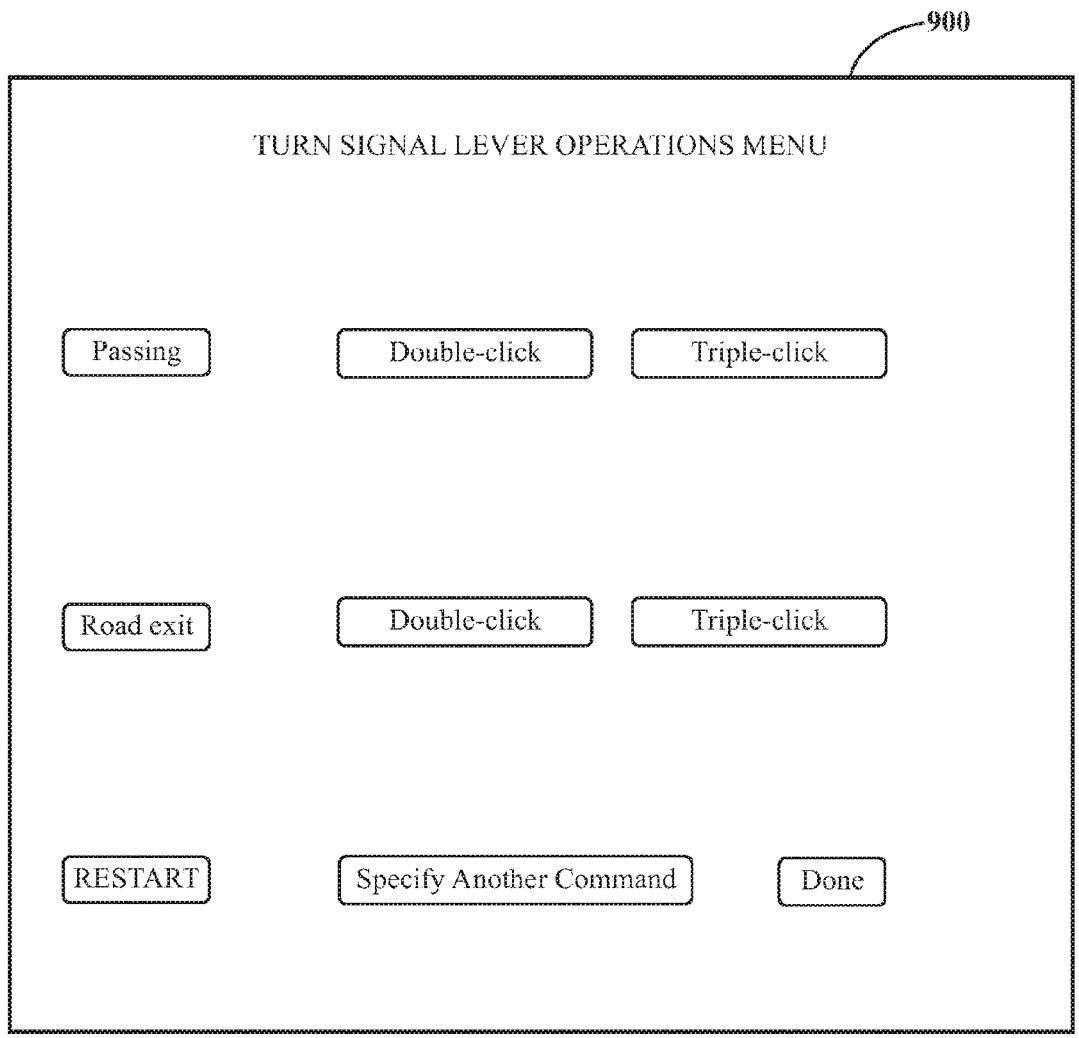
FIG. 5 shows one embodiment of a turn signal lever operations menu which may be displayed on a touch-screen.

In a particular embodiment, the control system 12 may be configured to enable a user to select the number of turn signal lever clicks that will activate a particular operational mode. This provides the user with some flexibility in specifying operation of the control commands so as to meet the user's particular needs, anticipated usage requirements and/or intuitive preferences. FIG. 5 shows one embodiment of a turn signal lever operations menu 900 usable to enable a user to select the number of turn signal lever clicks that will activate a particular operational mode. Menu 900 may be displayed on a touch-screen to enable a user to conveniently select the autonomous operation to be performed by each set of lever "clicks". Menu 900 shows all available options on a single screen. If the control system is configured to provide more options in addition to those shown in FIG. 6 and described herein, additional screens or an alternative arrangement may be necessary.

FIG. 5 shows a particular embodiment of the touch screen enabling a user to select the number of clicks used to initiate the passing and road exit operations. In addition, it will be understood that the operating modes described herein also apply to vehicles (for example, vehicles in the United Kingdom, Australia, etc.) which drive on the opposite side of the road from vehicles in the U.S. In such vehicles, the turn signal lever is located along the right side of the steering wheel. In such vehicles, clicking the turn signal levers downwardly (that is, in a clockwise direction) will initiate an associated autonomous command in a direction toward the right side of the vehicle, while clicking the lever in upwardly (in a counterclockwise direction) will initiate a command in a direction toward the left side of the vehicle. Thus, it is the direction of the click (whether clockwise or counterclockwise) that controls the direction in which the command is executed.

Referring to FIG. 5, a user may select one of the options shown by touching the associated portion of the screen. As the user selects "double-click" or "triple-click" options from the menu, these options become deactivated for other uses. For example, if the user selects "double-click" for use in activating an autonomous passing command along the left side of an object vehicle, the "double-click" option becomes unavailable for execution of any other commands. This may be indicated by "darkening" or changing the color of the text representing "double-click" under the other operation headings, while the "double-click" text under the "passing" operation is highlighted or otherwise changed to indicate that it is used to execute the "passing" operation.

The same procedure is followed for the road-exit operation. If desired, a user may decide to automate only one operation. In case the user decides to re-allocate the turn signal lever commands, a "restart" field is provided to erase all existing lever assignments and allow the user to start from the beginning. Also, a "specify another command" field may be provided to enable the user to allocate another autonomous operation to a different lever actuation. In addition, a "done" field may be provided to enable the user to leave this screen when all desired operations have been allocated.

In the embodiments described herein, the system is configured to respond to double-clicks or triple-clicks either in a manner pre-programmed into the control system or according to commands selected by the user as previously described. If a double-click or triple-click option has not been assigned an associated operation, use of the double-click or triple-click option will not produce an autonomous command response.

In another operational mode, the control system is configured to respond to a single click of the lever by executing an autonomous exit search operation when the vehicle is driving autonomously. In a particular embodiment, after a single click of the lever by a user, the control system examines the road up to a predetermined distance ahead of the ego-vehicle. The exit search operation is directed to identifying the exit nearest the vehicle.

The single click may be in either the up or down direction. To determine a location of an exit nearest the vehicle, responsive to the single click, both sides of the road may be examined for exits using satellite or navigation system map information, optical recognition of road signs or any other suitable sources of information. If no exit is detected within the predetermined distance to either side of the road, the vehicle continues in its current mode (whether manual or autonomous). If one or more exits are detected within the predetermined distance, the closest exit to the vehicle (on either side of the road) becomes the exit toward which the vehicle may be autonomously directed by the control system. The procedures followed for reaching the desired exit are as described elsewhere herein with respect to the road exit operation.

Also, if, during execution of a passing or road exit command, any vehicle system or component needed for execution of the autonomous passing, road exit, or associated operations becomes unavailable or malfunctions, the vehicle may return to whichever control mode (autonomous or manual) it was in prior to actuation of the turn signal lever. Alternatively, the vehicle may automatically be returned to manual control after the driver has been alerted to the need for manual control. If the vehicle was following a route programmed by the navigation system, the vehicle may return to or resume the programmed route.

In a particular embodiment, either of the passing or road exit commands may be initiated during use of the turn signal lever in a conventional mode, to signal a lane change. For example, if the lever is clicked counterclockwise and left in the actuated condition to operate an associated left rear signal light, a passing command on the left side may be initiated by simply clicking it counterclockwise a second time and leaving it in the actuated position. Similarly, if the lever is clicked counterclockwise and left in the actuated condition to operate the left rear signal light, a road exit command on the left side may be initiated by simply clicking it counterclockwise two more times, then leaving it in the actuated position.

In one embodiment, a vehicle control system as described herein is configured for installation in a vehicle by the vehicle manufacturer during fabrication. Referring again to FIG. 1, in a particular embodiment, the computing device 14 may be configured for retrofitting into an existing vehicle structured to operate autonomously to the degree necessary to execute one or more of the autonomous turn-signal lever responses described herein. The retrofit computing device (and any desired driver communication interface, such as a touch-screen, audio communication system, docking station, etc.) may be installed in the vehicle, in communication with the vehicle sensors and any suitable controllers and vehicle components so as to enable operation of the driver interface in the manner described herein.

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A computing device configured for communication with at least one autonomously controllable vehicle system or component, the computing device comprising one or more processors for controlling operation of the computing device, and a memory for storing data and program instructions usable by the one or more processors, wherein the one or more processors are configured to execute instructions stored in the memory to control a vehicle so as to execute one of an autonomous passing operation and an autonomous road exit operation, responsive to manual actuation of an associated control mechanism according to an associated manual actuation mode.

2. The computing device of claim 1 wherein the control mechanism comprises a button configured to initiate one of the autonomous passing operation, and autonomous road exit operation.

3. The computing device of claim 1 wherein the control mechanism comprises a turn signal lever configured to initiate execution of the one of the autonomous operations responsive to an associated manual actuation mode of the lever.

4. The computing device of claim 1 wherein the control mechanism comprises an interactive field of a touch screen display.

5. The computing device of claim 1 wherein the control mechanism comprises a voice-actuatable interface configured to initiate execution of the autonomous operation.

6. The computing device of claim 1 wherein the one or more processors are configured to execute instructions stored in the memory to control the vehicle so as to:
   execute an autonomous exit search operation responsive to manual actuation of an associated control mechanism according to an associated manual actuation mode; and
   responsive to detection, during execution of the exit search operation, of one or more exits within a predetermined distance ahead of the vehicle, control the vehicle in accordance with an autonomous road exit operation to exit the road at an exit closest to the vehicle within the predetermined distance ahead of the vehicle.

7. The computing device of claim 1 wherein the associated control mechanism is a turn signal lever, wherein the one or more processors are configured to execute instructions stored in the memory to control the vehicle so as to initiate an autonomous passing operation responsive to actuation of the turn signal lever according to a first manual actuation mode of the turn signal lever, and wherein the one or more processors are configured to execute instructions stored in the memory to control the vehicle so as to execute an autonomous road exit operation responsive to actuation of the turn signal lever according to a second manual actuation mode of the turn signal lever different from the first manual actuation mode.

8. The computing device of claim 1 wherein the one or more processors are configured to execute instructions stored in the memory to control the vehicle so as to, during execution of an autonomous passing operation, determine if there is a suitable passing lane adjacent the vehicle in a desired passing direction.

9. The computing device of claim 1 wherein the one or more processors are configured to execute instructions stored in the memory to control the vehicle so as to, during execution of an autonomous passing operation, determine whether an object vehicle is still driving in a lane in which the object vehicle was driving when the passing operation was initiated.

10. The computing device of claim 1 wherein the one or more processors are configured to execute instructions stored in the memory to control the vehicle so as to, during execution of an autonomous passing operation, determine whether either of a maximum occupant "comfort speed" or a road speed limit will be exceeded by the ego-vehicle during execution of the passing operation.

11. The computing device of claim 1 wherein the one or more processors are configured to execute instructions stored in the memory to control the vehicle so as to, during execution of an autonomous passing operation, determine if a road-exit operation or other route-related maneuver will need to be executed within a predetermined distance of the vehicle's current position.

12. The computing device of claim 1 wherein the one or more processors are configured to execute instructions stored in the memory to control the vehicle so as to, during execution of an autonomous passing operation, determine if another vehicle is driving immediately in front of an object vehicle designated to be passed by the vehicle.

13. The computing device of claim 12 wherein the one or more processors are configured to execute instructions stored in the memory to control the vehicle so as to, if another vehicle is driving immediately in front of the object vehicle, designate the other vehicle as the new object vehicle to be passed by the vehicle.

14. The computing device of claim 1 wherein the one or more processors are configured to execute instructions stored in the memory to control the vehicle so as to, during execution of an autonomous road exit operation, provide a notification containing information regarding structures and/or facilities located within a predetermined distance from a road exit at which the road exit operation is being executed.

15. The computing device of claim 14 wherein the one or more processors are configured to execute instructions stored in the memory to control the vehicle so as to enable a user to select, from the information provided in the notification, an autonomous driving destination for the vehicle.

16. The computing device of claim 1 wherein the one or more processors are configured to execute instructions stored in the memory to control the vehicle so as to, responsive to manual actuation of an associated control mechanism according to an associated manual actuation mode so as to execute an autonomous road exit operation:
   (a) determine a location of a nearest road exit along a side of a road on which the autonomous road exit operation is to occur;
   (b) calculate an estimate as to whether the vehicle can exit the road at the nearest road exit before the nearest road exit is passed;
   (c) if it is estimated that the vehicle can exit the road at the nearest road exit on before the nearest road exit is passed, autonomously direct the vehicle toward the nearest road exit; and
   (d) repeats steps (b) and (c) until the vehicle exits the road at the nearest road exit.

17. A method of controlling an autonomous vehicle comprising the step of initiating one of an autonomous passing operation, and an autonomous road exit operation, responsive to an associated manual actuation of an associated control mechanism.

18. The method of claim 17 wherein the associated control mechanism is a turn signal lever configured to initiate at least one of the autonomous passing operation, and the autonomous road exit operation.

19. The method of claim 18 wherein the step of initiating one of an autonomous passing operation, and an autonomous road exit operation, comprises the step of initiating the autonomous passing operation by double-clicking the turn signal lever.

20. The method of claim 18 wherein the step of initiating one of an autonomous passing operation and an autonomous road exit operation comprises the step of initiating the autonomous road exit operation by triple-clicking the turn signal lever.

* * * * *